(12) United States Patent
Thirumalli Sureshsah et al.

(10) Patent No.: US 10,959,286 B2
(45) Date of Patent: Mar. 23, 2021

(54) METHODS AND SYSTEMS FOR MANAGING CIRCUIT-SWITCHED (CS) SIGNALING CONNECTION RELEASE IN MOBILE COMMUNICATIONS

(71) Applicant: SAMSUNG ELECTRONICS CO., LTD., Suwon-si (KR)

(72) Inventors: Ramkumar Thirumalli Sureshsah, Karnataka (IN); Sameer Kumar Mandal, Karnataka (IN); Seshu Babu Songa, Karnataka (IN); Venkata Anil Kumar Karamsetti, Karnataka (IN); Goutham Ponnamreddy, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 16/260,982

(22) Filed: Jan. 29, 2019

(65) Prior Publication Data

US 2020/0100322 A1 Mar. 26, 2020

(30) Foreign Application Priority Data

Sep. 20, 2018 (IN) .............................. 201841035526

(51) Int. Cl.
*H04W 8/08* (2009.01)
*H04W 76/18* (2018.01)
*H04W 76/38* (2018.01)
*H04W 80/02* (2009.01)
*H04L 5/00* (2006.01)

(52) U.S. Cl.
CPC ............ *H04W 76/38* (2018.02); *H04L 5/0055* (2013.01); *H04W 8/08* (2013.01); *H04W 76/18* (2018.02); *H04W 80/02* (2013.01)

(58) Field of Classification Search
None
See application file for complete search history.

(56) References Cited

U.S. PATENT DOCUMENTS

| 5,905,667 | A  |   | 5/1999  | Lee |
|---|---|---|---|---|
| 6,259,925 | B1 | * | 7/2001  | Josse ........................ H04W 4/12 455/411 |
| 7,256,633 | B1 |   | 8/2007  | Rafiq |
| 8,885,517 | B2 |   | 11/2014 | Deivasigamani et al. |
| 9,419,014 | B2 |   | 8/2016  | Gurumurthy |
| 2004/0116120 | A1 | * | 6/2004 | Gallagher .............. H04W 76/30 455/436 |
| 2005/0186948 | A1 | * | 8/2005 | Gallagher .............. H04W 88/06 455/414.1 |
| 2007/0270140 | A1 | * | 11/2007 | Islam .................... H04W 76/38 455/423 |

(Continued)

*Primary Examiner* — Duc T Duong
(74) *Attorney, Agent, or Firm* — Sughrue Mion, PLLC

(57) ABSTRACT

A method and user equipment are provided. The method includes initiating a circuit-switched (CS) connection establishment procedure by transmitting a connection management (CM) service request message to a core network (CN). Mobility management (MM) connection establishment is aborted in response to failing to receive a CM service acceptance message within a time period. In response to subsequently receiving a CM service acceptance message after aborting the MM connection establishment, a circuit-switched (CS) signaling connection release action is performed.

18 Claims, 8 Drawing Sheets

(56) References Cited

U.S. PATENT DOCUMENTS

| | | | |
|---|---|---|---|
| 2008/0076419 A1* | 3/2008 | Khetawat | H04L 43/00 |
| | | | 455/435.1 |
| 2009/0253403 A1* | 10/2009 | Edge | H04W 76/50 |
| | | | 455/404.2 |
| 2010/0061295 A1* | 3/2010 | Preteseille | H04W 76/38 |
| | | | 370/328 |
| 2011/0039587 A1* | 2/2011 | Madhavan | H04W 4/14 |
| | | | 455/466 |
| 2011/0256850 A1* | 10/2011 | Selander | H04W 12/08 |
| | | | 455/411 |
| 2013/0032885 A1 | 2/2013 | Swamynathan et al. | |
| 2014/0167815 A1 | 6/2014 | Penzes | |
| 2015/0230070 A1* | 8/2015 | Kadiyala | H04W 4/16 |
| | | | 455/417 |
| 2017/0127244 A1* | 5/2017 | Kumar | H04W 60/04 |
| 2017/0134994 A1* | 5/2017 | Chinthalapudi | H04L 65/1089 |
| 2018/0152278 A1* | 5/2018 | Chen | H04L 67/141 |
| 2019/0357118 A1* | 11/2019 | Kim | H04W 80/10 |
| 2020/0008269 A1* | 1/2020 | Kuppelur | H04W 36/0022 |

* cited by examiner

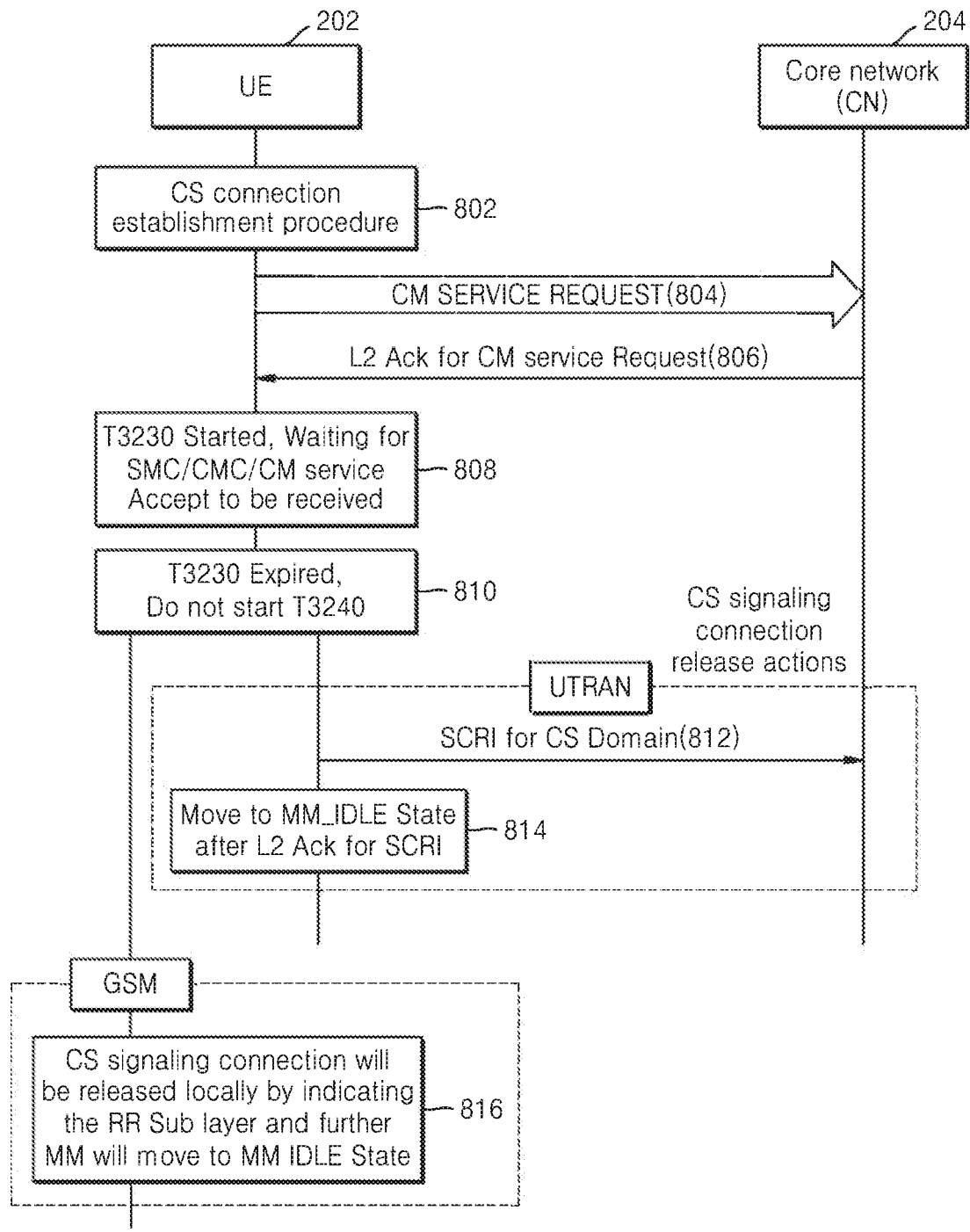

METHODS AND SYSTEMS FOR MANAGING CIRCUIT-SWITCHED (CS) SIGNALING CONNECTION RELEASE IN MOBILE COMMUNICATIONS

CROSS-REFERENCE TO RELATED APPLICATION

This Application claims priority from Indian Patent Application No. 201841035526, filed in the Indian Patent Office on Sep. 20, 2018, the entire contents of which is herein incorporated by references in its entirety.

BACKGROUND

1. Field

The present disclosure relates to circuit-switched (CS) connection management in mobile communications and more particularly to managing CS signaling connection release between a user equipment (UE) and a core network (CN) by avoiding a blockage of radio frequency (RF) resources.

2. Description of Related Art

In mobile communications, when a user wants to initiate services like a call establishment, a short message service (SMS), a supplementary service and so on, there is a need for a user equipment (UE) to establish a circuit-switched (CS) connection with a core network (CN) to further proceed with the corresponding service. The UE communicates with the CN through a radio access network associated with the CN.

In related art techniques, the UE initiates a CS connection establishment procedure for a user triggered service by sending a connection management (CM) service request message to the CN. In response to sending the CM service request message to the CN, the UE waits for a CM service acceptance message from the CN to further proceed with the user triggered service. When the UE does not receive the CM service acceptance message from the CN, the UE aborts a mobility management (MM) connection establishment and waits for a CS signaling connection release between the UE and the CN. However, an unnecessary CS signaling connection may be maintained between the UE and the CN when the UE receives the CM service acceptance message from the CN instead of the CS signaling connection release. In addition, the user may not be able to trigger a next service during the maintenance of the unnecessary CS signaling connection between the UE and the CN.

SUMMARY

It is an aspect to provide methods and systems for managing a circuit-switched (CS) signaling connection release between a user equipment (UE) and a core network (CN) by avoiding a blockage of radio frequency (RF) resources.

It is another aspect to provide a method for re-initiating a CS connection establishment procedure without waiting for an expiration of a second timer, wherein the CS connection establishment procedure may be re-initiated in response to receiving a circuit management (CM) service acceptance message from the CN after abortion of a mobility management (MM) connection establishment in the UE.

It is another aspect to provide a method for enabling the UE to perform CS signaling connection release actions without triggering the second timer.

According to an aspect of one or more example embodiments, there is provided a method for managing a circuit-switched (CS) signaling connection release between a user equipment (UE) and a core network (CN) in a mobile communication network, wherein the UE communicates with the CN through a radio access network associated with the CN, the method comprising initiating, by at least one processor of the UE, at least one CS connection establishment procedure for at least one service request by sending at least one connection management (CM) service request message to the CN; initiating, by the at least one processor of the UE, a first timer after sending the CM service request message, and during an active period of the first timer, waiting to receive at least one CM service acceptance message from the CN; in response to the first timer expiring without receiving a CM service acceptance message from the CN, initiating, by the at least one processor of the UE, a second timer; aborting, by the at least one processor of the UE, mobility management (MM) connection establishment in the UE in response to the first timer expiring without receiving the at least one CM service acceptance message from the CN; receiving, by the at least one processor of the UE, the at least one CM service acceptance message from the CN before the second timer expires; and in response to receiving the at least one CM service acceptance message from the CN, performing, by the at least one processor of the UE, at least one CS signaling connection release action before the second timer expires.

According to another aspect of one or more example embodiments, there is provided a method for managing a circuit-switched (CS) signaling connection release between a user equipment (UE) (202) and a core network (CN) (204) in a mobile communication network, wherein the UE communicates with the CN through a radio access network associated with the CN, the method comprising initiating, by at least one processor of the UE, at least one CS connection establishment procedure for at least one service request by sending at least one connection management (CM) service request message to the CN; initiating, by the at least one processor of the UE, a timer after sending the CM service request message, and during active period of the timer, waiting to receive at least one CM service acceptance message from the CN for the at least one CM service request message; and performing, by the at least one processor of the UE, at least one CS signaling connection release action after the timer expires without receiving the at least one CM service acceptance message from the CN, wherein the at least one CS signaling connection release action is different depending on the radio access network associated with the CN.

According to another aspect of one or more example embodiments, there is provided a user equipment (UE), wherein the UE communicates with a core network (CN) through a radio access network associated with the CN, the UE comprising at least one memory configured to store computer program code; and at least one processor configured to access the at least one memory and operate according to the computer program code, the computer program code including connection management (CM) code configured to cause at least one of the at least one processor to initiate at least one CS connection establishment procedure for at least one service request by sending at least one connection management (CM) service request message to the CN; and mobility management (MM) code configured to cause at least one of the at least one processor to initiate a first timer after sending the CM service request message, and during an active period of the first timer, waiting to receive at least one CM service acceptance message from the CN; in response to the first timer expiring without receiving a CM service acceptance message from the CN, initiate a second timer; abort mobility management (MM) connection establishment in the UE in response to the first timer expiring without receiving the at least one CM service acceptance message from the CN; receive the at least one CM service acceptance message from the CN before the second timer expires; and in response to receiving the at least one CM service acceptance message from the CN, perform at least one CS signaling connection release action before the second timer expires.

According to another aspect of one or more example embodiments, there is provided a user equipment (UE), wherein the UE communicates with the CN through a radio access network associated with the CN, the UE comprising at least one memory configured to store computer program code; and at least one processor configured to access the at least one memory and operate according to the computer program code, the computer program code including connection management (CM) code configured to cause at least one of the at least one processor to initiate at least one CS connection establishment procedure for at least one service request by sending at least one connection management (CM) service request message to the CN; and mobility management (MM) code configured to cause at least one of the at least one processor to initiate a timer after sending the CM service request message, and during active period of the timer, waiting to receive at least one CM service acceptance message from the CN for the at least one CM service request message; and perform at least one CS signaling connection release action after the timer expires without receiving the at least one CM service acceptance message from the CN, wherein the at least one CS signaling connection release action is different depending on the radio access network associated with the CN.

According to another aspect of one or more example embodiments, there is provided a method comprising initiating a circuit-switched (CS) connection establishment procedure by transmitting, by at least one processor, a connection management (CM) service request message to a core network (CN); aborting mobility management (MM) connection establishment in response to failing to receive a CM service acceptance message within a time period; and in response to subsequently receiving a CM service acceptance message after aborting the MM connection establishment, performing a circuit-switched (CS) signaling connection release action.

BRIEF DESCRIPTION OF THE DRAWINGS

Example embodiments are described below with reference to the accompanying drawings, in which:

FIG. 8 is an example sequence illustrating CS signaling connection release actions performed by a UE without triggering a second timer, according to example embodiments.

DETAILED DESCRIPTION

Figure 1:
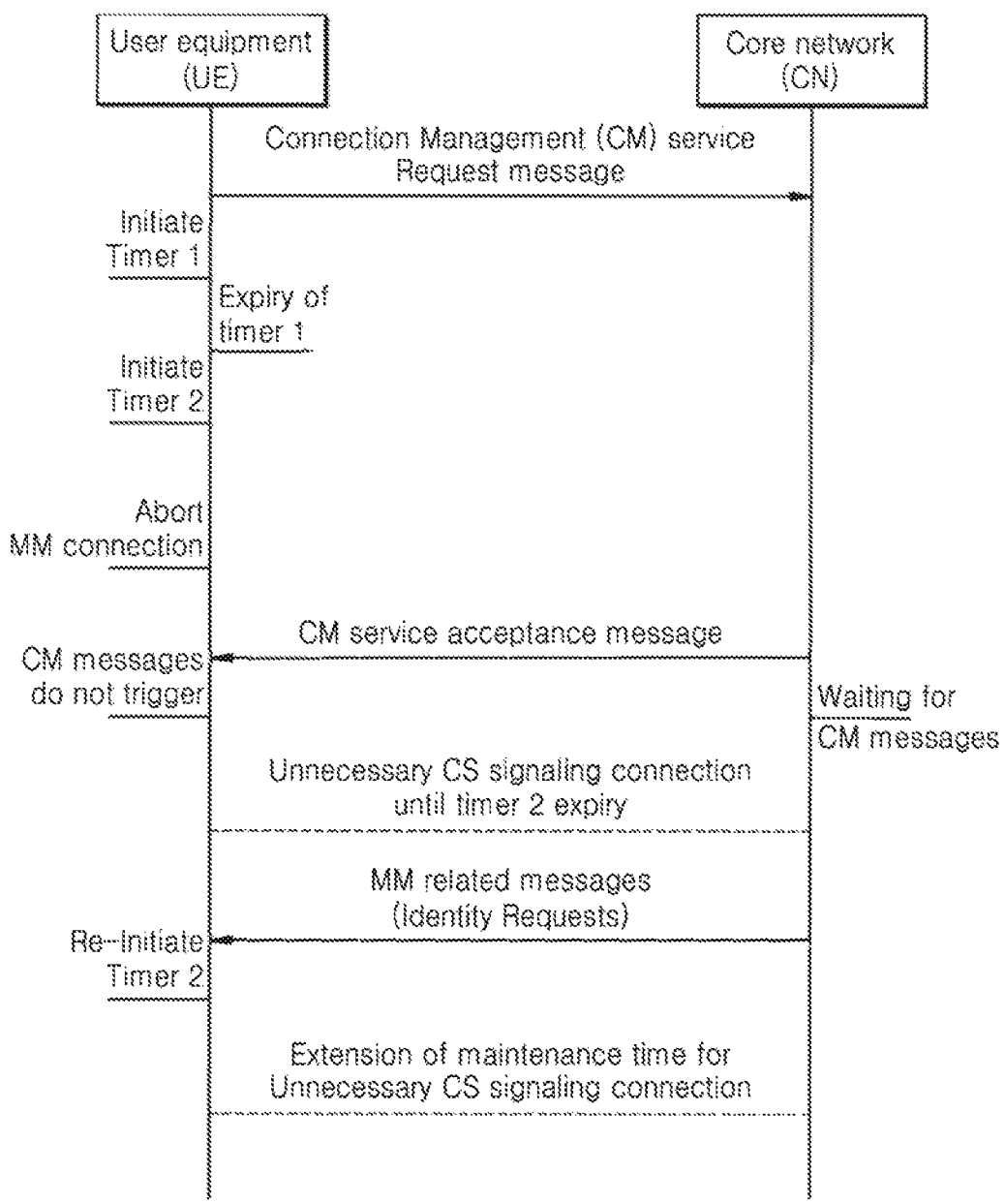
FIG. 1 is an example sequence illustrating an unnecessary circuit-switched (CS) signaling connection maintained between a user equipment (UE) and a core network (CN) during an establishment of a CS connection with the CN, according to the related art.

The example embodiments herein and the various features and advantageous details thereof are explained more fully with reference to the non-limiting example embodiments that are illustrated in the accompanying drawings and detailed in the following description. In the drawings, like reference numbers refer to like components throughout the drawings. Descriptions of well-known components and processing techniques are omitted so as to not unnecessarily obscure the example embodiments herein. The description herein is intended merely to facilitate an understanding of ways in which the example embodiments herein may be practiced and to further enable those of skill in the art to practice the example embodiments herein. Accordingly, this disclosure should not be construed as limiting the scope of the example embodiments herein. Moreover, in this specification, the phrase "at least one of A and B" includes "only one A", "only one B", and "both A and B".

FIG. 1 is an example sequence illustrating an unnecessary CS signaling connection maintained between a UE and a CN during an establishment of a CS connection with the CN, according to the related art. As illustrated in FIG. 1, for initiating the CS connection establishment procedure, the UE sends a CM service request message to the CN. The CS connection establishment procedure may be a call related procedure, a short message service (SMS) related procedure, a supplementary service related message and so on. After sending the CM service request message to the CN, the UE initiates a timer 1 while waiting for the CM service acceptance message from the CN. The timer 1 may be a timer T3230. When the timer T3230 expires without receiving the CM service acceptance message, the UE initiates a timer 2 while waiting for the CS connection release between the UE and the CN. The timer 2 may be a timer T3240. Also, the UE aborts the MM connection establishment.

Further, the CN may send the CM service acceptance message to the UE after the expiry of the timer 1. After the expiry of the timer 1, the UE does not initiate CM messages for the received CM service acceptance message due to abortion of the MM connection establishment. However, in response to sending the CM service acceptance message to the UE, the CN waits for the CM messages from the UE by maintaining the unnecessary CS signaling connection which results in a blockage of radio frequency (RF) resources. Furthermore, in case of Dual SIM Dual Standby (DSDS), due to the unnecessary CS signaling connection, the UE may not be able to perform operations on other stacks that require the RF resources.

Furthermore, the CN may send MM related messages (identity requests) to the UE before the expiry of the timer 2. In response to receiving the identity requests from the CN, the UE re-initiates the timer 2. Thereby, a maintenance time for the unnecessary CS signaling connection may be extended.

Further, if the UE initiates a next CS connection establishment procedure immediately before the expiry of the timer 2, the UE does not trigger a next CM service request message for the next CS connection establishment procedure until the expiry of the timer 2. Thus, a redial mechanism cannot be triggered because the next CS connection establishment is not possible until the expiry of the timer 2 and results in a bad end-user experience.

The example embodiments herein disclose methods and systems for managing a circuit-switched (CS) signaling connection release between a user equipment (UE) and a core network (CN) in a mobile communication network, wherein the UE communicates with the CN through a radio access network associated with the CN.

A method disclosed herein includes initiating one or service request procedures for one or more connection management (CM) procedures. The one or more CM establishment procedures may be, but is not limited to, a call establishment procedure, a short message service (SMS) related procedure, a supplementary service related procedure, or the like. The one or more CM establishment procedures may be initiated by sending one or more connection management (CM) service request messages to the CN. Further, the method includes initiating a first timer when waiting for receiving one or more CM service acceptance messages for the one or more CM service request messages. In response to determining an expiry of the first timer without receiving the one or more CM service acceptance messages from the CN, the method includes starting a second timer when waiting for a CS connection release between the UE and the CN. Further, the method includes aborting a mobility management (MM) connection establishment in the UE and indicating to the corresponding CM layers.

Further, the method includes receiving the one or more CM service acceptance messages from the CN before an expiry of the second timer. In response to receiving the one or more CM service acceptance messages from the CN before the expiry of the second timer, the method includes performing one or more CS signaling connection release actions before the expiry of the second timer. The one or more CS signaling connection release actions may be performed depending on the radio access network associated with the CN.

Further, the method includes performing the one or more CS signaling connection release actions after the expiry of the first timer without receiving the one or more CM service acceptance messages. Thus, the one or more CS signaling connection release actions may be performed without initiating the second timer.

Further, the method includes initiating one or more subsequent CS connection establishment procedures for the one or more service requests after receiving the one or more CM service acceptance messages from the CN before the expiry of the second timer. Further, the method includes comparing the one or more subsequent CS connection establishment procedures with one or more previous CS connection establishment procedures. In response to determining that the one or more subsequent CS establishment procedures are same as the one or more previous CS connection establishment procedures, the method includes performing a first set of actions. The first set of actions may be performed for completion of the initiated one or more subsequent connection establishment procedures by sending one or more CM messages to the CN. The one or more CM messages may be related to the subsequent CS connection establishment procedure.

Further, in response to determining that the one or more subsequent CS connection establishment procedures differ from the one or more previous CS connection establishment procedures, the method includes performing a second set of actions. The second set of actions may be performed to initiate the one or more subsequent CS establishment procedures.

Referring now to the drawings, and more particularly to FIGS. 2 through 8, where similar reference characters denote corresponding features consistently throughout the figures, there are shown various example embodiments.

Figure 2:
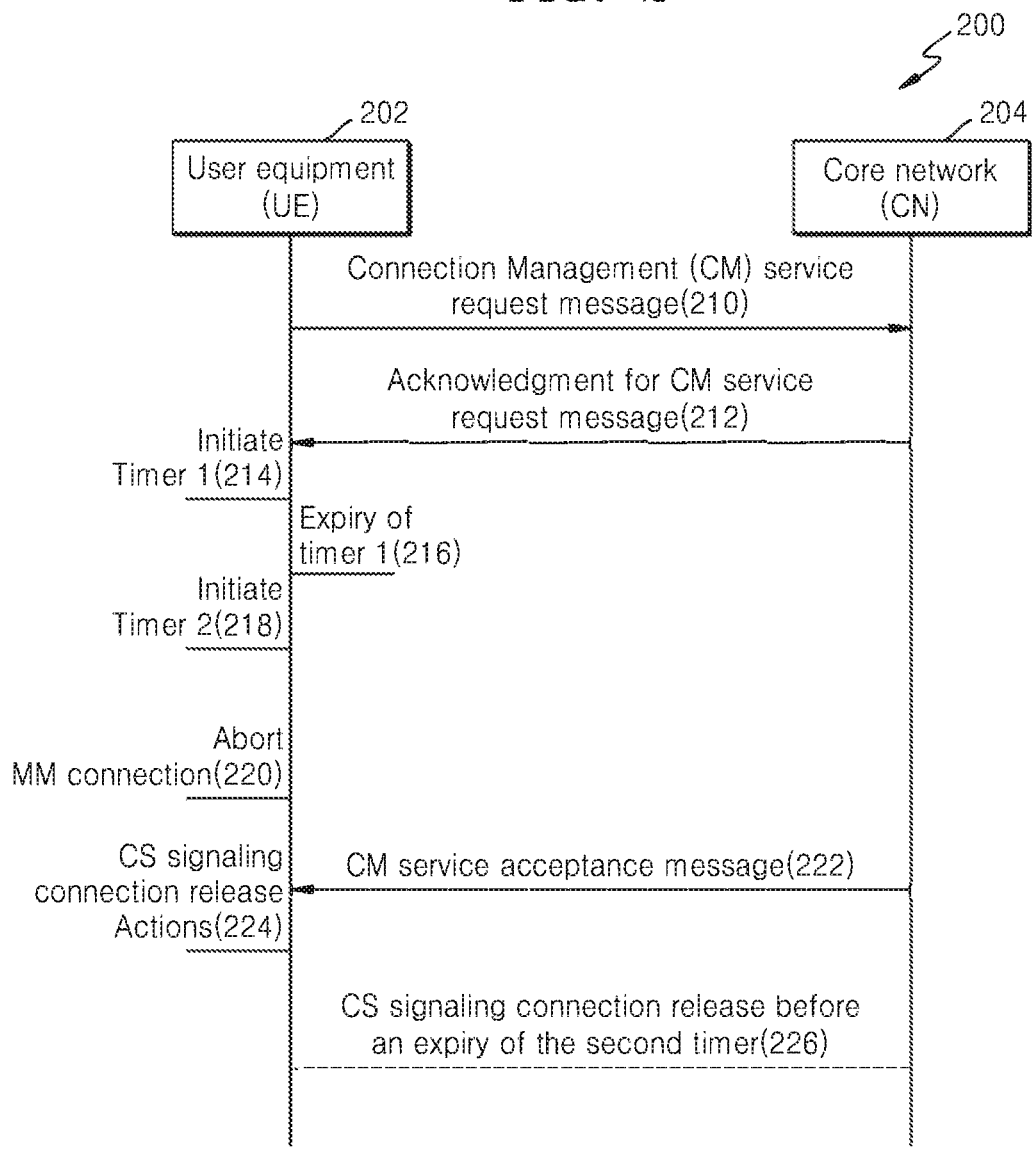
FIG. 2 is an example sequence illustrating controlling of a CS signaling connection release between a UE and a CN in a mobile communication network, according to example embodiments.

FIG. 2 is an example sequence 200 illustrating controlling of a circuit-switched (CS) signaling connection release between a user equipment (UE) 202 and a core network (CN) 204 in a mobile communication network, according to example embodiments. The UE 202 may be, but is not limited to, a mobile phone, a smartphone, tablet, a phablet, a personal digital assistant (PDA), a laptop, a computer, a wearable computing device, a vehicle infotainment device, an Internet of Things (IoT) device, a navigation device, or any other device configured to communicate using the mobile communication network. The UE 202 utilizes functions and procedures supported by a non access stratum (NAS) layer to transfer data to the CN 204 through a radio access network associated with the CN 204. The radio access network may be, but is not limited to, a third generation network, a Universal mobile telecommunications (UMTS) Terrestrial Radio Access Network (UTRAN), a 3G based communication, a Global System for Mobile Communications (GSM), a GSM EDGE Radio Access Network (GERAN), a 2G based communication, a Long Term Evolution (LTE/4G) or the like. The NAS layer further includes a connection management (CM) layer, a mobility management (MM) layer and a radio resource management (RR) layer for establishing, maintaining and terminating a CS connection between the UE 202 and the CN 204 for user triggered services.

As illustrated in FIG. 2, the UE 202 may be configured to initiate a CS connection establishment procedure by triggering a service request. The service request can include a request for at least one of the user triggered services such as, but not limited to, a call establishment, a short message service (SMS), a supplementary service (dialing Unstructured Supplementary Service Data (USSD) codes, call forwarding, call waiting, USSD messages and so on), or the like. The CS connection establishment procedure may be, but is not limited to, a call establishment procedure, a short message service (SMS) related procedure, a supplementary service related procedure, or the like.

The UE 202 may initiate the CS connection establishment procedure by generating a connection management (CM) service request message. At 210, the UE 202 sends the CM service request message to the CN 204. After sending the CM service request message to the CN 204, at operation 212, the UE 202 may receive an acknowledgment for the CM service request message from the CN 204.

On receiving the acknowledgment for the CM service request message, the UE 202 initiates a first timer at operation 214 while waiting for a CM service acceptance message (security mode command in 3G/ciphering mode command in 2G/"CM SERVICE ACCEPT" message in 2G/3G) from the CN 204. An example of the first timer may be a timer T3230. When the first timer T3230 expires before receiving the CM service acceptance message (operation 216), the UE 202 initiates a second timer at operation 218 while waiting for the CS signaling connection release between the UE 202 and the CN 204. An example of the second timer may be a timer T3240. Thereafter, the UE 202 aborts a mobility management (MM) connection establishment in the UE 202 at operation 220 and indicates the aborted MM connection establishment to the CM layer.

At operation 222, the UE 202 may receive the CM service acceptance message from the CN 204 instead of receiving a CS signaling connection release indication message from the CN 204. The CM service acceptance message may be received by the UE 202 before an expiry of the second timer. On receiving the CM service acceptance message before the expiry of the second timer, at operation 224, the UE 202 performs CS signaling connection release actions before the expiry of the second timer. At operation 226, the CS signaling connection release occurs before an expiry of the second timer. The CS signaling connection release actions may be performed by the UE 202 depending on the radio access network associated with the CN 204. Thus, the CS signaling connection between the UE 202 and the CN 204 may be released efficiently by avoiding a blockage of radio frequency (RF) resources.

In some example embodiments, the UE 202 may be configured to perform the CS signaling connection release actions without initiating the second timer. Thus, the CS signaling connection between the UE 202 and the CN 204 may be released without any delay.

In some example embodiments, the UE 202 may be further configured to re-initiate the CS connection establishment procedure immediately after receiving the service acceptance message from the CN 204 before the expiry of the second timer. Thus, a next CM message as part of redial mechanism may be triggered immediately without waiting for the expiry of the second timer.

Figure 3:
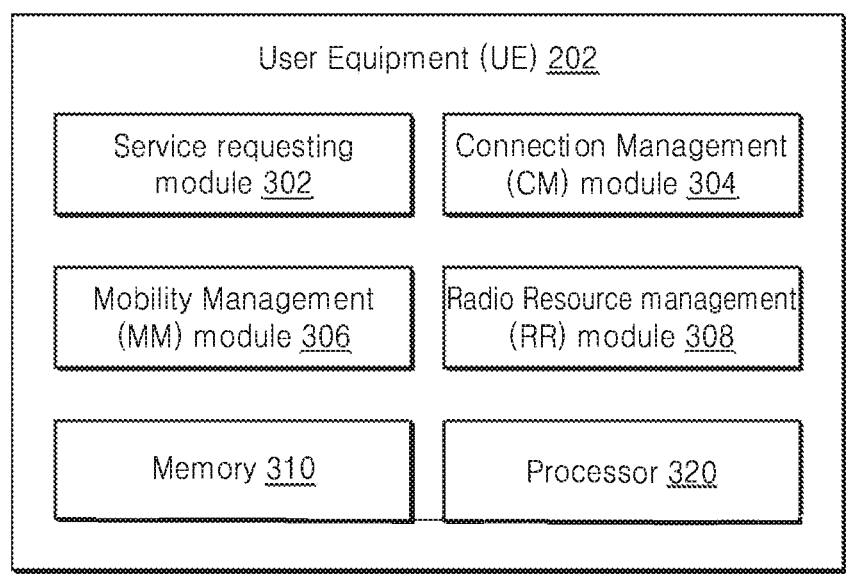
FIG. 3 is a block diagram illustrating modules of a UE for performing CS signaling connection release actions, according to example embodiments.

FIG. 3 is a block diagram illustrating a configuration of the UE 202 for performing the CS signaling connection release actions, according to example embodiments. The UE 202 initiates the CS connection establishment procedure and performs the CS signaling connection release actions when the UE 202 does not receive the CM service acceptance procedure from the CN 204 before the expiry of the first timer. Thus, the CS signaling release actions performed by the UE 202 avoids maintenance of the unnecessary CS signaling connection between the UE 202 and the CN 204. The UE 202 includes a service requesting module 302, a connection management (CM) module 304, a mobility management (MM) module 306, a radio resource management (RR) module 308, a memory 310, and a processor 320. The processor 320 may be one or more microprocessors and may, in conjunction with the memory 310, implement the functions of the service requesting module 302, the connection management (CM) module 304, the mobility management (MM) module 306, and the radio resource management (RR) module 308.

The service requesting module 302 may be configured to indicate the service requested by the user to the CM module 304. The service may be, but is not limited to, a call establishment, a short message service (SMS), a supplementary service (dialing USSD codes, call forwarding, call waiting, USSD messages and so on), or the like. The service requesting module 302 provides the triggered service request to the CM module 304.

The CM module 304 may be configured to provide functions and procedures supported by the CM layer of the NAS layer. The CM module 304 handles the corresponding service request received from service requesting module 302. On receiving the triggered service request from the service requesting module 302, the CM module 304 may be configured to initiate the CS connection establishment procedure for the triggered service request. The CS connection establishment procedure may be, but is not limited to, a call establishment procedure, a SMS related procedure, a supplementary service related procedure, or the like. The CM module 304 initiates the CS connection establishment procedure by generating the CM service request message according to the procedures supported by sub-layers of the CM layer such as, but not limited to, a call control layer, a SMS layer, a supplementary service layer, or the like. Further, the CM module 304 sends the generated CM service request message to the CN 204 and receives the acknowledgment for the CM service request message from the CN 204. The CM module 304 provides information about the received acknowledgment to the MM module 306.

The MM module 306 may be configured to provide functions and procedures provided by the MM layer of the NAS layer. The MM module may be configured for handling the triggering CM service request and accept, and also for local release related action. On receiving the information about the acknowledgment from the CM module 304, the MM module 306 may be configured to initiate the first timer while waiting for the CM service acceptance message. An example of the first timer may be T3230. The first timer may expire without receiving the CM service acceptance message. Further, the MM module 306 may initiate the second timer in response to determining the expiry of the first timer without receiving the CM service acceptance message from the CN 204. An example of the second timer may be T3240. The second timer may be initiated while waiting for the CS signaling connection release between the UE 202 and the CN 204.

The MM module 306 may be further configured to abort the MM connection establishment in the UE 202. The MM connection establishment may be aborted as the MM module 306 does not receive the CM service acceptance message from the CN 204 after the expiry of the first timer. Also, the MM module 306 provides information about the aborted MM connection establishment to the CM module 304. The CM module 304 further indicates about the aborted MM connection establishment to the CM layer. Thus, CM messages may not be generated for establishing the CS connection with the CN 204 for the user triggered service.

The MM module 306 may be further configured to receive the CM service acceptance message from the CN 204 before the expiry of the second timer. The CM service acceptance message may be received instead of receiving the CS signaling connection release message from the CN 204. On receiving the CM service acceptance message from the CN 204 before the expiry of the second timer, the MM module 306 may perform the CS signaling connection release actions before the expiry of the second timer. The CS signaling connection release actions may be performed based on the radio access network through which the UE 202 communicates with the CN 204.

In some example embodiments herein, if the radio access network includes, but is not limited to, a third generation network, a Universal mobile telecommunications (UMTS) Terrestrial Radio Access Network (UTRAN), a 3G based communication or the like, the CM service acceptance message received from the CN 204 may be a security mode command, a "CM SERVICE ACCEPT", or the like. On receiving the security mode command before the expiry of the timer T3240, the MM module 306 performs the CS signaling connection release actions by sending the CS signaling connection release indication to the CS domain of the CN 204 in order to release the CS signaling connection between the UE 202 and the CN 204 before the expiry of the second timer. Further, the MM module 306 moves an UE state to an idle state (a MM idle state) by receiving a layer 2 (L2) level acknowledgment for the CS signaling connection release indication.

In some example embodiments herein, if the radio access network includes, but is not limited to, a Global System for Mobile Communications (GSM), a GSM EDGE Radio Access Network (GERAN), a 2G based communication or the like, then the CM service acceptance message received from the CN 204 may be a cipher mode command, a "CM SERVICE ACCEPT" or the like. On receiving the cipher mode command before the expiry of the second timer, the MM module 306 performs the CS signaling connection release actions by releasing the CS signaling connection between the UE 202 and the CN 204 locally by indicating to the RR module 308. Further, the MM module 306 moves the UE state to the idle state. Thus, the maintenance of the unnecessary CS signaling connection between the UE 202 and the CN 204 even after the aborted MM connection establishment may be avoided.

The RR module 308 may be configured to release the dedicated RF resources for the CS connection establishment procedure according to procedures supported by the RR layer. Therefore, an unnecessary RF resource blockage may be avoided for peer stack and further mobile terminal (MT) CS paging cannot be missed for the Peer stack in Dual-SIM Dual-Standby (DSDS) mobiles.

In some example embodiments, the MM module 306 may be configured to perform the CS signaling connection release actions after the expiry of the first timer without receiving the CM service acceptance message from the CN 204. Thus, the UE 202 may able to perform the CS signaling connection release actions without initiating the second timer.

In some example embodiments, the MM module 306 may be configured to re-initiate the CS connection establishment procedure without any delay after aborting the MM connection establishment. For re-initiating the CS connection establishment procedure, the MM module 306 may be configured to receive a subsequent/next CS connection establishment procedure from the CM module 304. The subsequent CS connection establishment procedure may be a procedure initiated by the CM module 304 after receiving the CM service acceptance message from the CN 204 before the expiry of the second timer.

After receiving the subsequent CS connection establishment procedure, the MM module 306 compares the subsequent CS connection establishment procedure with a previous CS connection establishment procedure initiated by the CM module 304 (the CS connection establishment procedure initiated before the abortion of the MM connection establishment). If the subsequent CS connection establishment procedure is same as the previous CS connection establishment procedure, then the MM module 306 establishes the MM connection with the CN 204. Also, the MM module 306 provides information about the established MM connection to the CM module 304. The CM module 304 further generates CM messages corresponding to the subsequent CS connection establishment procedure and sends the CM messages to the CN 204 for establishing the CS connection with the CN 204. The CM messages may be generated according to the procedures supported by the CM layer. Thus, enabling the UE 202 and the CN 204 to be in synchronized state to handle the subsequent CS connection establishment procedure without any delay.

If the subsequent CS connection establishment procedure is not same as the previous CS connection establishment procedure, then the MM module 306 requests the CM module 304 to save a request related to the subsequent CS connection establishment procedure and performs the CS signaling connection release actions based on the radio access network associated with the CN 204. Further, the MM module 306 moves the UE state to the idle state and requests the CM module 304 to process the saved request. Thus, a redial mechanism may be triggered immediately by receiving the CM service acceptance message after abortion of the MM connection establishment.

The memory 310 may be configured to store the CS connection establishment procedures and the CM request messages. The memory 310 may include one or more computer-readable storage media. The memory 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 310 may, in some examples, be considered a non-transitory storage medium. The term "non-transitory" may indicate that the storage medium is not embodied in a carrier wave or a propagated signal. However, the term "non-transitory" should not be interpreted to mean that the memory 310 is non-movable. In some example embodiments, the memory 310 may be configured to store larger amounts of information than the memory. In certain examples, a non-transitory storage medium may store data that may, over time, change (e.g., in Random Access Memory (RAM) or cache). As discussed above, the processor 320 may include one or more processors and may, in conjunction with the memory 310, perform various functions of the modules in FIG. 3.

FIG. 3 shows exemplary modules of the UE 202, but it is to be understood that other example embodiments are not limited thereon. In other example embodiments, the UE 202 may include fewer or more modules. Further, the labels or names of the modules are used only for illustrative purpose and does not limit the scope of the example embodiments herein. One or more modules may be combined together to perform same or substantially similar function in the UE 202.

Figure 4:
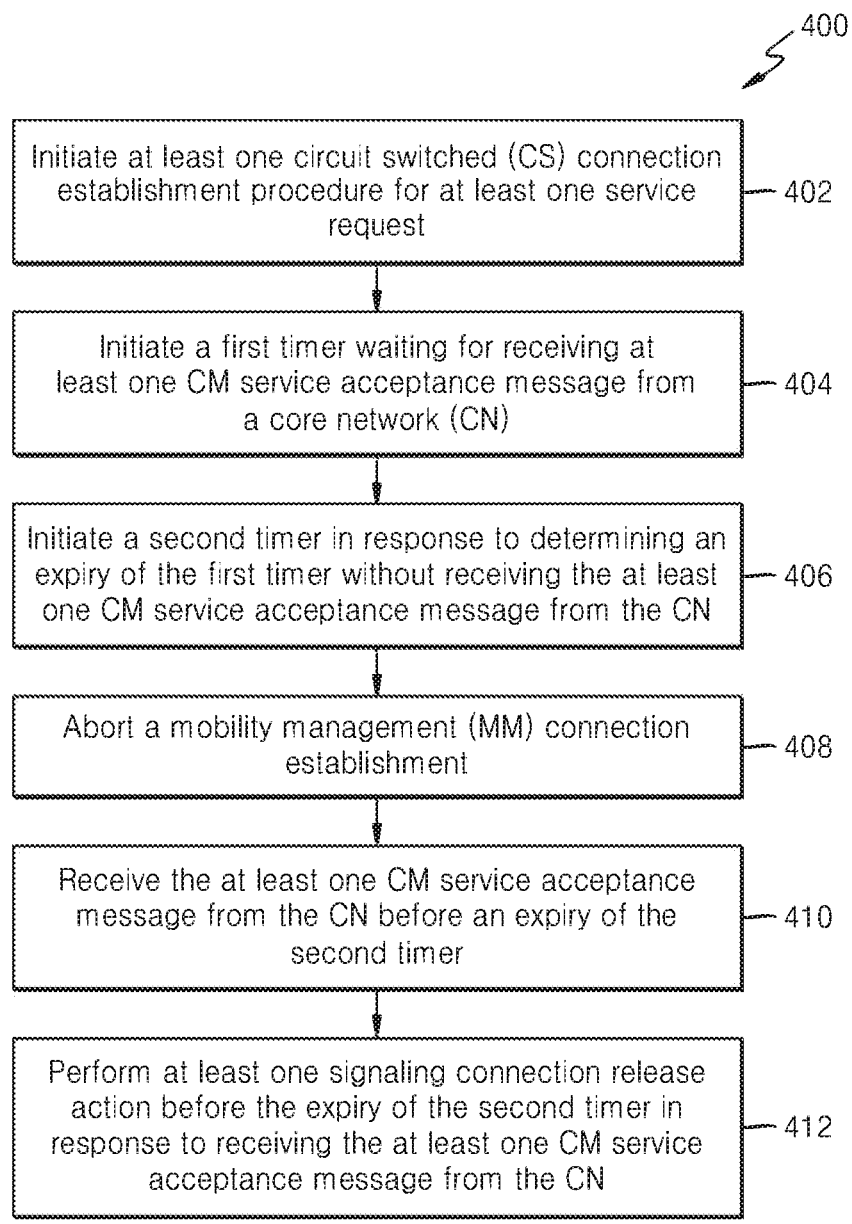
FIG. 4 is a flow diagram illustrating a method for managing a CS signaling connection release between a UE and a CN in a mobile communication network, according to example embodiments.

FIG. 4 is a flow diagram illustrating a method for managing a CS signaling connection release between the UE 202 and the CN 204 in a mobile communication, according to example embodiments.

At step 402, the method includes initiating the CS connection establishment procedure for the service request. The method allows the CM module 304 to initiate the CS connection establishment procedure for the service request. The service requesting module 302 generates the service request based on the user triggered services. The CM module 304 initiates the CS connection establishment procedure by generating the CM service request message. The CM service request message may be sent to the CN 204.

At step 404, the method includes initiating the first timer waiting for receiving the CM service acceptance message from the CN 204. The method allows the MM module 306 to initiate the first timer waiting for receiving the CM service acceptance message from the CN 204. The MM module 306 initiates the first timer when the CM module 304 receives the acknowledgement for the CM service request message from the CN 204.

At step 406, the method includes initiating the second timer in response to determining the expiry of the first timer without receiving the CM service acceptance message. The method allows the MM module 306 to initiate the second timer in response to determining the expiry of the first timer without receiving the CM service acceptance message. The second timer may be initiated while waiting for the CS signaling connection release between the UE 202 and the CN 204.

At step 408, the method includes aborting the MM connection establishment in the UE 202. The method allows the MM module 306 to abort the MM connection establishment in the UE 202. The MM module 306 aborts the MM connection establishment, when the MM module 306 does not receive the CM service acceptance message from the CN 204 before the expiry of the first timer. The information about the aborted MM connection establishment may be provided to the CM module 304. Thus, the CM module 304 may not generate the CM messages corresponding to the CS connection establishment procedure.

At step 410, the method includes receiving the CM service acceptance message from the CN 204 before the expiry of the second timer. The method allows the MM module 306 to receive the CM acceptance message from the CN 204 before the expiry of the second timer.

At step 412, the method includes performing the CS signaling connection before the expiry of the second timer in response to receiving the CM service acceptance message from the CN 204. The method allows the MM module 306 to perform the CS signaling connection before the expiry of the second timer in response to receiving the CM service acceptance message from the CN 204.

The CM service acceptance message may be received by the MM module 306 before the expiry of the second timer instead of receiving the CS signaling connection release message from the CN 204. Further, the CS signaling connection release actions may be performed based on the radio access network associated with the CN 204. The radio access network comprises a first radio access network and a second radio access network. The first radio access network may be, but is not limited to, a third generation network, a Universal mobile telecommunications (UMTS) Terrestrial Radio Access Network (UTRAN), a 3G based communication, or the like. The second radio access network may be, but is not limited to, a Global System for Mobile Communications (GSM), a GSM EDGE Radio Access Network (GERAN), a 2G based communication or the like.

Further if the first radio access network is associated with the CN 204, the CM service acceptance message received by the MM module 306 from the CN 204 may be the security mode command, or the like. When the first radio access network is associated with the CN 204, the CS signaling connection actions performed before the expiry of the second timer includes sending the CS signaling connection release indication to the CS domain of the CN 204 and moving the UE state to the idle state by receiving the acknowledgment for the CS signaling connection release indication.

Similarly, if the second radio access network is associated with the CN 204, the CM service acceptance message received by the MM module 306 from the CN 204 may be a cipher mode command or the like. When the second radio access network is associated with the CN 204, the CS signaling connection actions performed before the expiry of the second timer includes releasing the CS signaling connection between the UE 202 and the CN 204 locally by indicating to the RR module 308. Thus, the unnecessary CS signaling connection between the UE 202 and the CN 204 may be avoided.

The various actions, acts, blocks, steps, or the like in the method and the flow diagram 400 may be performed in the order presented, in a different order or simultaneously. Further, in some example embodiments, some of the actions, acts, blocks, steps, or the like may be omitted, added, modified, skipped, or the like without departing from the scope of the invention.

Figure 5:
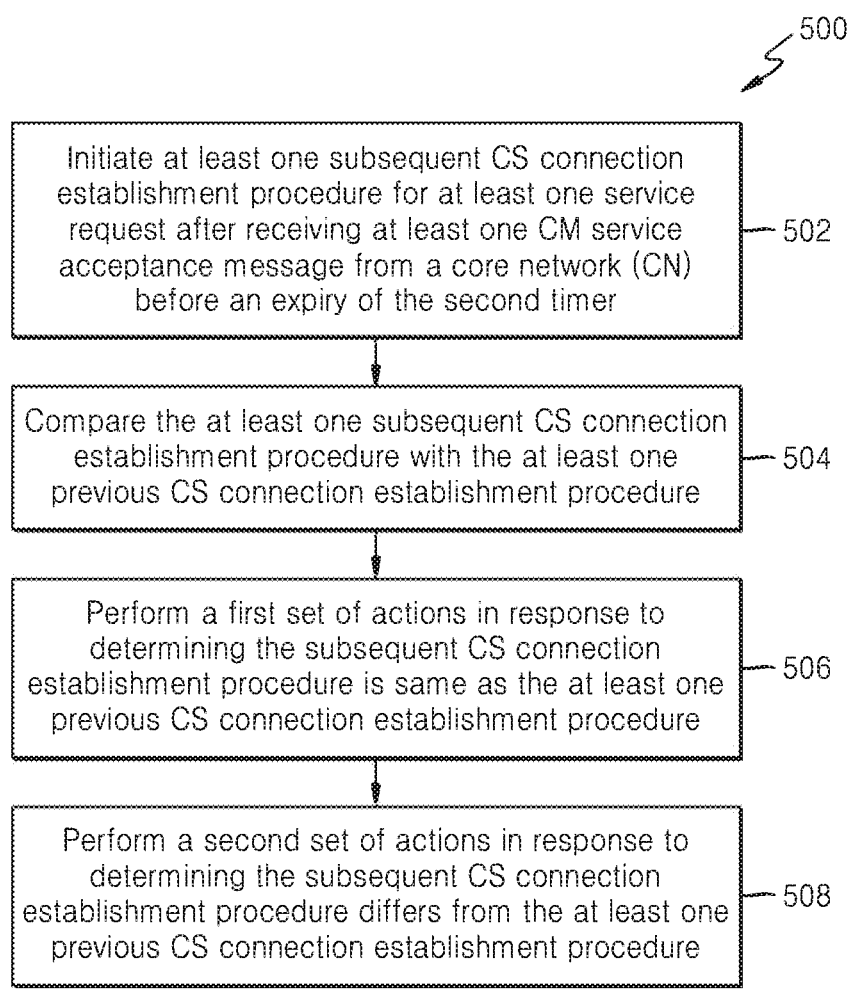
FIG. 5 is a flow diagram illustrating a method for re-initiating a CS connection establishment procedure with a CN without any delay, according to example embodiments.

FIG. 5 is a flow diagram illustrating a method for re-initiating the CS connection establishment procedure with the CN without any delay, according to example embodiments.

At step 502, the method includes initiating the subsequent CS connection establishment procedure by receiving the CM service acceptance message from the CN 204 before the expiry of the second timer. The method allows the CM module 304 to initiate the subsequent CS connection establishment procedure by receiving the CM service acceptance message from the CN 204 before expiry of the second timer. The subsequent CS connection establishment procedure may be initiated by generating the subsequent CM request message.

At step 504, the method includes comparing the subsequent CS connection establishment procedure with the previous CS connection establishment procedure. The method allows the MM module 306 to compare the subsequent CS connection establishment procedure with the previous CS connection establishment procedure.

At step 506, the method includes performing a first set of actions in response to determining that the subsequent CS connection establishment procedure is same as the previous CS connection establishment procedure. The method allows the MM module 306 to perform the first set of actions in response to determining that the subsequent CS connection establishment procedure is same as the previous CS connection establishment procedure. The first set of actions includes establishing the MM connection with the CN 204 and providing the information about the established MM connection to the CM module 304 for further transaction of the CM messages to the CN 204. Thus, the CS connection establishment procedure may be re-initiated before the expiry of the second timer without any delay.

At step 508, the method includes performing a second set of actions in response to determining that the subsequent CS connection establishment procedure differs from the previous CS connection establishment procedure. The second set of actions includes saving the subsequent CM request message by the CM module 304 and performing the CS signaling connection release actions by the MM module 306. Further, the MM module 306 moves the UE state to the idle state and requests the CM module 304 to process the saved subsequent CM request message.

Figure 6:
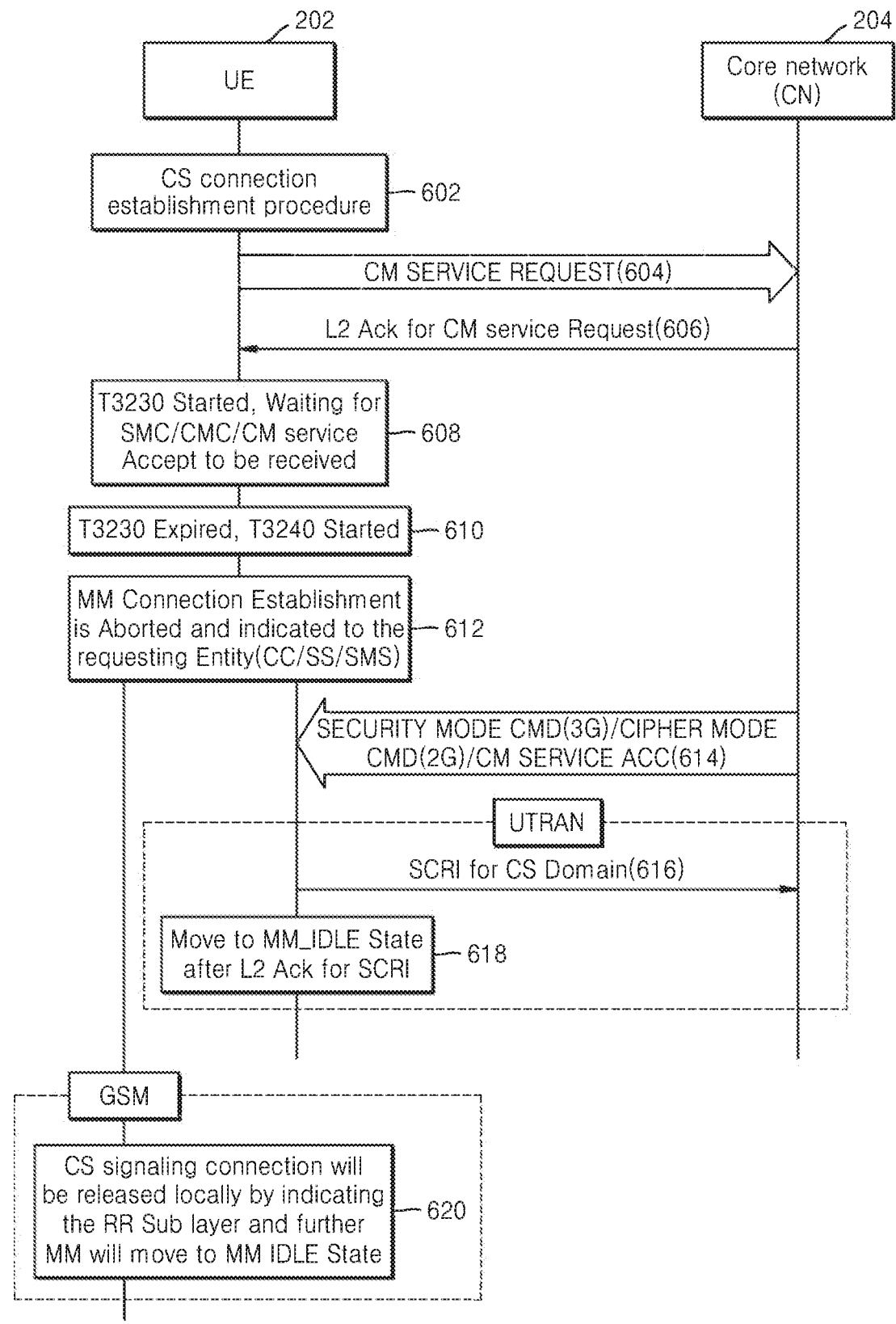
FIG. 6 is an example sequence illustrating CS signaling connection release actions performed by a UE during an establishment of a CS connection with a CN, according to example embodiments.

FIG. 6 is an example sequence illustrating CS signaling connection release actions performed by the UE 202 during an establishment of the CS connection with the CN 204, according to example embodiments.

As illustrated in FIG. 6, the UE 202 initiates the CS connection establishment procedure in operation 602 for the service request triggered by the user. The service request may include the request for the services such as, but not limited to, a call establishment, a SMS service, a supplementary service, or the like. The CS connection establishment procedure may be, but is not limited to, a call establishment procedure, a SMS procedure, a supplementary service (SS) procedure and so on. For example, if the user wants to make a call, then a call establishment request may be triggered by the service requesting module 302 of the UE 202. On receiving the call establishment request, the CM module 304 of the UE 202 initiates the call establishment procedure. Thereafter, the CM module 304 generates the CM service request message for the call establishment procedure and further sends the CM service request message to the CN 204 in operation 604. Further, the CN 204 may send the acknowledgment for the CM service request message in operation 606.

On receiving the acknowledgment for the CM service request message from the CN 204, the MM module 306 of the UE 202 initiates the first timer at operation 608. The first timer may be initiated while waiting for receiving the CM service acceptance message from the CN 204 to proceed with the call establishment procedure. When the first timer expires without receiving the CM service acceptance message, the MM module 306 can initiate the second timer at operation 610. The second timer may be initiated while waiting for the CS signaling connection release between the UE 202 and the CN 204. Further, the MM module 306 can abort the MM connection establishment in the UE 202 when the first timer expires without receiving the CM service acceptance message at operation 612, and the information about the aborted MM connection establishment may be sent to the CM module 304. The CM module 304 may not generate the CM messages for continuing the call establishment procedure.

Further, the CN 204 may send the CM service acceptance message to the MM module 306 before the expiry of the second timer instead of sending the acknowledgement for the CS signaling release between the UE and the CN at operation 614. On receiving the CM service acceptance message, the MM module 306 performs the CS signaling connection release actions before the expiry of the second timer. The CS signaling connection release actions may be performed depending on the radio access network through which the UE communicates with the CN. The CM acceptance service message may be, but is not limited to, a cipher mode command, a security mode command, a "CM SERVICE ACCEPT" message or the like.

For example, if the radio access network is UTRAN (3G based communication), then the CS signaling connection release indication may be sent by the MM module 306 to the CS domain of the CN for releasing the CS signaling connection established with the UE. Also, the UE state may be moved to the idle state (MM_idle state) by the MM module 306 after receiving the acknowledgment for the CS signaling connection release indication from the CN at operation 618. Similarly, if the radio access network is GSM (2G based communication), the MM module 306 can release the CS signaling connection between the UE and the CN locally at operation 620. Then, the UE state may be moved to the idle state by the MM module 306 by indicating to the RR module 308 for releasing the RF resources. Thus, the unnecessary CS signaling connection between the UE and the CN may be released and next CS connection establishment procedures may be initiated without any delay.

Figure 7:
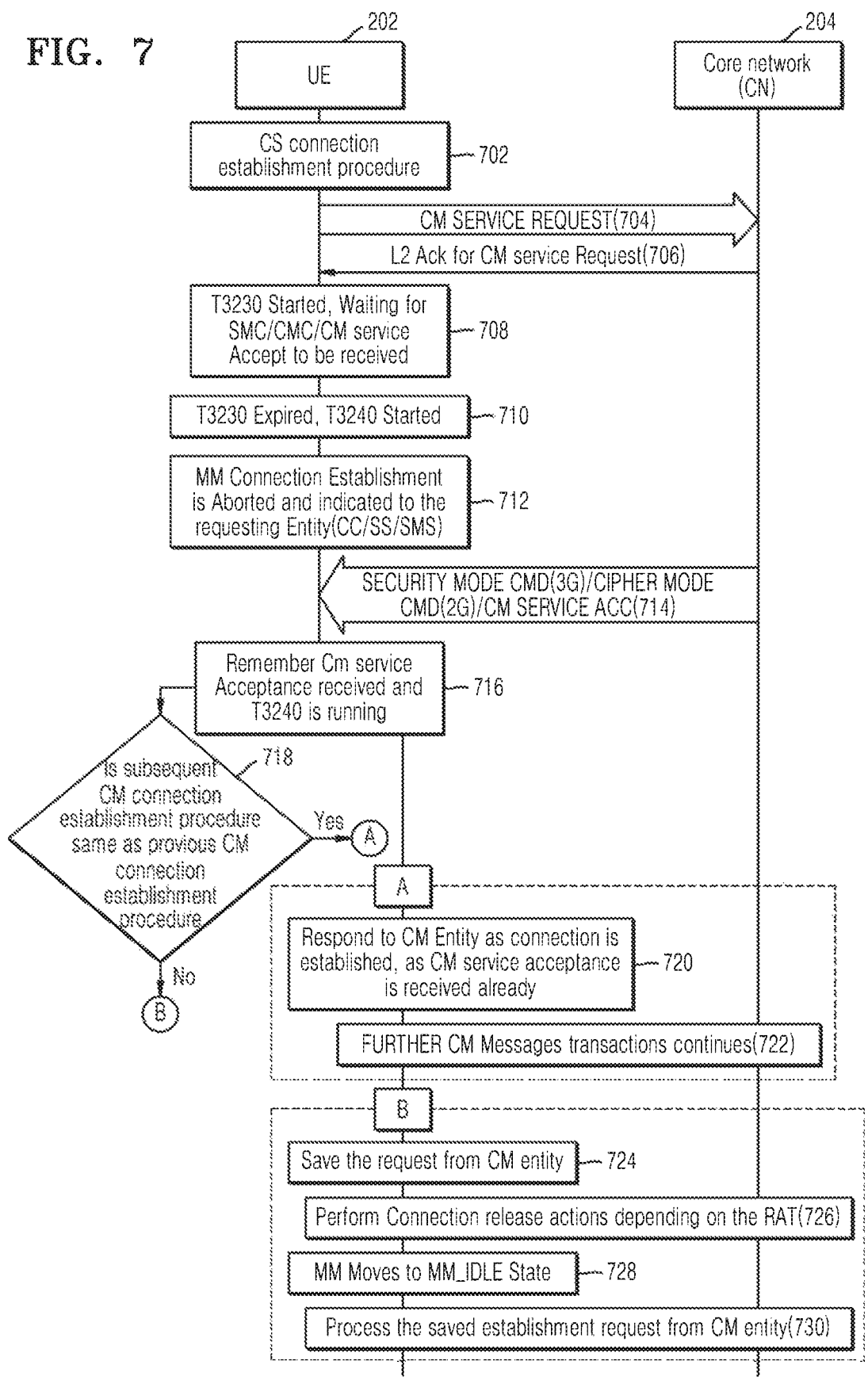
FIG. 7 is an example sequence illustrating re-usage of a CS connection establishment procedure without waiting for an expiry of a second timer, according to example embodiments.

FIG. 7 is an example sequence illustrating re-usage of the CS connection establishment procedure with the CN 204 without waiting for the expiry of the second timer, according to example embodiments.

As illustrated in FIG. 7, the CS connection establishment procedure may be initiated at operation 702 by the CM module 304 by sending the CM service request message to the CN 204 at operation 704. The first timer may be initiated to wait for receiving the CM service acceptance message from the CN at operation 708. Once the first timer is expired without receiving the CM service request message from the CN, the second timer may be initiated at operation 710 and the MM connection establishment in the UE may be aborted by the MM module 306 at operation 712.

Further, the CM module 304 may initiate the subsequent CS connection establishment procedure after receiving the CM service acceptance message before the expiry of the second timer at operation 714. The MM module 306 may remember the CM service acceptance is received and the timer T3240 is running at operation 716. At operation 718, the CM module 304 compares the subsequent CS connection establishment procedure with the previous CS connection establishment procedure. If the subsequent CS connection procedure is same as the previous CS connection establishment procedure (operation 718, YES), then a first set of actions A may be performed by the MM module 306. Otherwise (operation 718, NO), a second set of actions B may be performed by the MM module 308.

For example, the subsequent CS connection establishment procedure may be a call establishment procedure and the previous CS connection establishment procedure may be a call establishment procedure. As the subsequent and the previous CS connection establishment procedures are same, the first set of actions may be performed by the MM module 306. Further, the first set of actions A may include establishing the MM connection with the CN and providing the information about the established MM connection to the CM module 304 in operation 720. Further, the CM module 304 sends the CM messages to the CN 204 for re-establishing the CS connection with the CN for the call establishment in operation 722.

In another example, the subsequent CS connection establishment procedure may be a SMS related procedure and the previous CS connection establishment procedure may be a call establishment procedure. As the subsequent and the previous CS connection establishment procedures are different, the second set of actions B may be performed by the MM module 306. The second set of actions B may include saving the CM message request generated for the SMS related procedure (the next CS connection establishment procedure) at operation 724. Thereafter, the CS signaling connection release actions may be performed to process the SMS related procedure at operation 726. The MM may then move to MM_IDLE state in operation 728, and the saved establishment request from the CM entity may be processed in operation 730. Thus, the UE may not be required to wait until the expiry of the second timer for re-initiating the subsequent CS connection establishment procedure.

FIG. 8 is an example sequence illustrating the CS signaling connection release actions performed by the UE 202 without triggering the second timer, according to example embodiments.

As illustrated in FIG. 8, the CS connection establishment procedure may be initiated in operation 802 by the CM module 304 by sending the CM service request message to the CN 204 in operation 804. The CN 204 may send an acknowledgment to the UE 202 in operation 806. The first timer may be initiated when waiting to receive the CM service acceptance message from the CN 204 in operation 808. Once the first timer is expired without receiving the CM service request message from the CN, the second timer may not be initiated by the MM module 306 in operation 810. Further, the CS signaling connection release actions may be performed by the MM module 306 instead of initiating the second timer. For example, if the radio access network is UTRAN (3G based communication), then the CS signaling connection release indication (SCRI) may be sent by the MM module 306 to the CS domain of the CN for releasing the CS signaling connection established with the UE in operation 812. Also, the UE state may be moved to the idle state (MM_idle state) by the MM module 306 after receiving the acknowledgment for the CS signaling connection release indication from the CN 204 in operation 814. Similarly, if the radio access network is GSM (2G based communication), the MM module 306 can release the CS signaling connection between the UE and the CN locally in operation 816. Then, the UE state may be moved to the idle state by the MM module 306 by indicating to the RR module 308 for releasing the RF resources. Thus, the next CS connection establishment procedures may be initiated without any delay and results in a better user experience.

The example embodiments disclosed herein may be implemented through at least one software program running on at least one hardware device and performing network management functions to control the elements. The software program may include software program code that is executed by one or more processors, as described above. The elements shown in FIG. 2 and FIG. 3 may be at least one of a hardware device, or a combination of hardware device and software module. That is, each of the elements may be implemented as a hardware device in some example embodiments, or may be implemented as a combination of a hardware device and software module in other example embodiments.

The foregoing description of the specific example embodiments will so fully reveal the general nature of the example embodiments herein that others can, by applying current knowledge, readily modify and/or adapt for various applications such specific example embodiments without departing from the generic concept, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of example embodiments, those skilled in the art will recognize that the example embodiments herein may be practiced with modification within the spirit and scope of the example embodiments as described herein and as set forth in the appended claims.

We claim:

1. A method for managing a circuit-switched (CS) signaling connection release between a user equipment (UE) and a core network (CN) in a mobile communication network, wherein the UE communicates with the CN through a radio access network associated with the CN, the method comprising:
   initiating, by at least one processor of the UE, at least one CS connection establishment procedure for at least one service request by sending at least one connection management (CM) service request message to the CN;
   initiating, by the at least one processor of the UE, a first timer after sending the CM service request message, and during an active period of the first timer, waiting to receive at least one CM service acceptance message from the CN;
   in response to the first timer expiring without receiving a CM service acceptance message from the CN, initiating, by the at least one processor of the UE, a second timer;
   aborting, by the at least one processor of the UE, mobility management (MM) connection establishment in the UE in response to the first timer expiring without receiving the at least one CM service acceptance message from the CN;
   receiving, by the at least one processor of the UE, the at least one CM service acceptance message from the CN before the second timer expires; and
   in response to receiving the at least one CM service acceptance message from the CN, performing, by the at least one processor of the UE, at least one CS signaling connection release action before the second timer expires.

2. The method of claim 1, wherein the radio access network includes at least one first radio access network, wherein the first radio access network includes at least one of a third generation network, a Universal mobile telecommunications (UMTS) Terrestrial Radio Access Network (UTRAN) and a 3G based communication network.

3. The method of claim 2, wherein performing the at least one CS signaling connection release action comprises:
   triggering a CS signaling connection release indication for a CS domain of the CN in response to receiving the CM service acceptance message from the CN before the second timer expires, wherein the CM service acceptance message received from the CN includes at least one of a security mode command and a "CM SERVICE ACCEPT" message; and
   in response to receiving a layer 2 (L2) level acknowledgment for the CS signaling connection release indication from the CN, moving an UE state to an idle state by releasing a CS signaling connection with the CN before the second timer expires.

4. The method of claim 1, wherein the radio access network includes at least one second radio access network, wherein the second radio access network includes at least one of a Global System for Mobile Communications (GSM), a 2G based communication network and a GSM Enhanced Data rates for GSM Evolution (EDGE) Radio Access Network (GERAN).

5. The method of claim 3, wherein performing the at least one CS signaling connection release action comprises:
   in response to receiving the CM service acceptance message from the CN before the second timer expires, releasing the CS signaling connection with the CN locally, wherein the CM service acceptance message received from the CN includes at least one of a cipher mode command and a "CM SERVICE ACCEPT" message; and
   moving the UE state to the idle state before the second timer expires.

6. The method of claim 1, further comprising
   after receiving the at least one CM service acceptance message from the CN before the second timer expires, initiating, by the at least one processor of the UE, at least one subsequent CS connection establishment procedure for the at least one service request;

comparing, by the at least one processor of the UE, the at least one subsequent CS connection establishment procedure with the at least one CS connection establishment procedure;

performing, by the at least one processor of the UE, a first set of actions in response to determining the subsequent CS connection establishment procedure is same as the at least one CS connection establishment procedure, wherein performing the first set of actions comprises:
  indicating to a CM layer about an establishment of the MM connection with the CN to generate at least one CM message corresponding to the at least one subsequent CS connection procedure; and
  sending the at least one CM message to the CN for establishing the CS connection with the CN; and performing, by the at least one processor of the UE, a second set of actions in response to determining the subsequent CS connection establishment procedure differs from the at least one CS connection establishment procedure, wherein performing the second set of actions comprises:
  saving a subsequent CM request message associated with the subsequent CS connection establishment procedure; and
  performing the at least one CS signaling connection release action before the second timer expires to process the saved subsequent CM request message.

7. A user equipment (UE), wherein the UE communicates with a core network (CN) through a radio access network associated with the CN, the UE comprising:
  at least one memory configured to store computer program code; and
  at least one processor configured to access the at least one memory and operate according to the computer program code, the computer program code including:
    connection management (CM) code configured to cause at least one of the at least one processor to initiate at least one CS connection establishment procedure for at least one service request by sending at least one connection management (CM) service request message to the CN; and
    mobility management (MM) code configured to cause at least one of the at least one processor to:
      initiate a first timer after sending the CM service request message, and during an active period of the first timer, waiting to receive at least one CM service acceptance message from the CN;
      in response to the first timer expiring without receiving a CM service acceptance message from the CN, initiate a second timer;
      abort mobility management (MM) connection establishment in the UE in response to the first timer expiring without receiving the at least one CM service acceptance message from the CN;
      receive the at least one CM service acceptance message from the CN before the second timer expires; and
      in response to receiving the at least one CM service acceptance message from the CN, perform at least one CS signaling connection release action before the second timer expires.

8. The user equipment of claim 7, wherein the radio access network includes at least one first radio access network, wherein the first radio access network includes at least one of a third generation network, a Universal mobile telecommunications (UMTS) Terrestrial Radio Access Network (UTRAN) and a 3G based communication network.

9. The user equipment of claim 8, wherein the MM code is configured to cause the at least one of the at least one processor to, in response to determining the first radio access network is associated with the CN:
  trigger a CS signaling connection release indication for a CS domain of the CN in response to receiving the CM service acceptance message from the CN before the second timer expires, wherein the CM service acceptance message received from the CN includes at least one of a security mode command and a "CM SERVICE ACCEPT" message; and
  in response to receiving a layer 2 (L2) level acknowledgment for the CS signaling connection release indication from the CN, move an UE state to an idle state by releasing a CS signaling connection with the CN before the second timer expires.

10. The user equipment of claim 7, wherein the radio access network includes at least one second radio access network, wherein the second radio access network includes at least one of a Global System for Mobile Communications (GSM), a 2G based communication network and a GSM Enhanced Data rates for GSM Evolution (EDGE) Radio Access Network (GERAN).

11. The user equipment of claim 9, wherein the MM code is configured to cause the at least one of the at least one processor to, in response to determining the second radio access network is associated with the CN:
  release the CS signaling connection with the CN locally in response to receiving the CM service acceptance message from the CN before the second timer expires, wherein the CM service acceptance message received from the CN includes at least one of a cipher mode command and a "CM SERVICE ACCEPT" message; and
  move the UE state to the idle state before the second timer expires.

12. The user equipment of claim 7, wherein the computer program code further comprises code configured to cause at least one of the at least one processor to:
  initiate at least one subsequent CS connection establishment procedure for the at least one service request after receiving the at least one CM service acceptance message from the CN before the second timer expires;
  compare the at least one subsequent CS connection establishment procedure with the at least one CS connection establishment procedure;
  perform a first set of actions in response to determining the subsequent CS connection establishment procedure is same as the at least one CS connection establishment procedure, wherein the first set of actions comprises:
    indicating to a CM layer about an establishment of the MM connection with the CN to generate at least one CM message corresponding to the at least one subsequent CS connection procedure; and
    sending the at least one CM message to the CN for establishing the CS connection with the CN; and
  perform a second set of actions in response to determining the subsequent CS connection establishment procedure differs from the at least one CS connection establishment procedure, wherein the second set of actions comprises:
    saving a subsequent CM request message associated with the subsequent CS connection establishment procedure; and
    performing the at least one CS signaling connection release action before the second timer expires to process the saved subsequent CM request message.

13. A method comprising:
  initiating a circuit-switched (CS) connection establishment procedure by transmitting, by at least one processor, a connection management (CM) service request message to a core network (CN);
  aborting mobility management (MM) connection establishment in response to failing to receive a CM service acceptance message within a time period; and
  in response to subsequently receiving a CM service acceptance message after aborting the MM connection establishment, performing a circuit-switched (CS) signaling connection release action.

14. The method of claim 13, wherein the time period comprises a first time period defined by setting and expiring of a first timer.

15. The method of claim 14, wherein the method comprises setting a second timer before aborting the MM connection establishment, and
  wherein the CS signaling connection release action is performed before the second timer expires.

16. The method of claim 13, wherein the CS signaling connection release action is different depending on a radio access network associated with the CN.

17. The method of claim 16, wherein the CS signaling connection release action comprises:
  in response to the CM service acceptance message including at least one of a security mode command and a "CM SERVICE ACCEPT" message, transmitting a CS signaling connection release indication for a CS domain of the CN in response to receiving the CM service acceptance message; and
  in response to receiving a layer 2 (L2) level acknowledgment for the CS signaling connection release indication from the CN, moving an UE state to an idle state by releasing a CS signaling connection with the CN.

18. The method of claim 17, wherein the CS signaling connection release action comprises:
  in response to receiving the CM service acceptance message including at least one of a cipher mode command and a "CM SERVICE ACCEPT" message, releasing the CS signaling connection with the CN locally; and
  moving the UE state to the idle state.

* * * * *